US011439925B2

(12) United States Patent
Blank et al.

(10) Patent No.: US 11,439,925 B2
(45) Date of Patent: Sep. 13, 2022

(54) MULTIPLE-STREAM PRESSURIZED LOW POLARITY WATER EXTRACTION APPARATUS, SYSTEM, AND METHODS OF USE

(71) Applicant: SENSIENT NATURAL EXTRACTION INC., Delta (CA)

(72) Inventors: Keegan Blank, Delta (CA); Steve Tordiffe, Delta (CA); Lisa Ranken, Delta (CA)

(73) Assignee: SENSIENT NATURAL EXTRACTION INC., Delta (CA)

( * ) Notice: Subject to any disclaimer, the term of this patent is extended or adjusted under 35 U.S.C. 154(b) by 0 days.

(21) Appl. No.: 16/979,208

(22) PCT Filed: Mar. 8, 2019

(86) PCT No.: PCT/CA2019/050284
§ 371 (c)(1),
(2) Date: Sep. 9, 2020

(87) PCT Pub. No.: WO2019/169503
PCT Pub. Date: Sep. 12, 2019

(65) Prior Publication Data
US 2020/0406164 A1 Dec. 31, 2020

(30) Foreign Application Priority Data
Mar. 9, 2018 (CA) ...................................... 2997848

(51) Int. Cl.
*B01D 11/02* (2006.01)
*B01J 4/00* (2006.01)

(52) U.S. Cl.
CPC ...... *B01D 11/0284* (2013.01); *B01D 11/0207* (2013.01); *B01J 4/001* (2013.01); *B01D 11/0288* (2013.01); *B01J 2204/007* (2013.01)

(58) Field of Classification Search
CPC ............ B01D 11/0284; B01D 11/0207; B01D 11/0288; B01D 11/0215; B01D 11/0203;
(Continued)

(56) References Cited

U.S. PATENT DOCUMENTS

| 2,788,264 | A | * | 4/1957 | Bremer | ................ B01J 19/0013 |
| | | | | | 422/138 |
| 3,929,411 | A | * | 12/1975 | Takano | .............. G01N 35/1097 |
| | | | | | 436/180 |
| 5,614,089 | A | * | 3/1997 | Allington | ............ F16K 15/1823 |
| | | | | | 210/659 |

(Continued)

FOREIGN PATENT DOCUMENTS

CA 2836200 A1 2/2014

OTHER PUBLICATIONS

International Searching Authority. International Search Report and Written Opinion for application PCT/CA2019/050284, dated Jun. 11, 2019. 7 pages.

*Primary Examiner* — Joseph W Drodge
(74) *Attorney, Agent, or Firm* — Quarles & Brady, LLP

(57) ABSTRACT

An apparatus for extraction and recovery of components from biomass feedstocks with pressurized low polarity water. The apparatus is configured with four or more reaction columns, wherein each column is in separate communication with a supply of hot water, a first supply of pressurized heated water, a second supply of pressurized heated water, and a supply of pressurized cooling water. Components may be extracted concurrently from two or more batches of the biomass by, first placing the two batches of biomass into two selected columns, separately flooding the two columns with pressurized water, heating the columns and their contents to the point where the water becomes pressurized low polarity (PLP) water, recovering the PLP water comprising the extracted components from (Continued)

the two selected columns, cooling the columns with PLP water, and removing the spent biomass material from the columns.

14 Claims, 12 Drawing Sheets

(58) Field of Classification Search
CPC .......... B01D 11/028; A23L 2/04; A23L 21/10; A23L 21/15; B01J 19/0006; B01J 19/0013; B01J 19/004; B01J 19/0046; B01J 19/1825; B01J 19/1881; B01J 19/2425; B01J 19/2445; B01J 2219/00038; B01J 2219/00049; B01J 2219/00051; B01J 2219/00054; B01J 2219/00087; B01J 2219/00103; B01J 2219/00105; B01J 2219/0011; B01J 2219/0059; B01J 2219/00599; B01J 2219/00601; B01J 2219/00682; B01J 2219/00686; B01J 2219/00891; B01J 2219/00894; B01J 4/00; B01J 4/001; B01J 4/008; B01J 2204/002; B01J 2204/007

See application file for complete search history.

(56) References Cited

U.S. PATENT DOCUMENTS

| | | | |
|---|---|---|---|
| 6,159,442 A * | 12/2000 | Thumm | B01F 5/0256 239/420 |
| 2003/0223909 A1 * | 12/2003 | Oberbeck | B01F 5/0604 422/606 |
| 2004/0166177 A1 * | 8/2004 | Martin | A23L 33/115 424/725 |
| 2007/0014912 A1 * | 1/2007 | Mazza | A23L 5/44 426/615 |
| 2008/0063565 A1 * | 3/2008 | Prieto Barranco | B01J 19/0046 422/68.1 |
| 2010/0151098 A1 * | 6/2010 | Catchpole | B01D 11/0492 426/425 |
| 2012/0070538 A1 * | 3/2012 | Mantius | A61K 31/353 426/50 |
| 2015/0157958 A1 * | 6/2015 | Mazza | B01D 11/0207 422/618 |
| 2016/0091226 A1 * | 3/2016 | Buese | B01D 11/0284 62/115 |
| 2016/0228789 A1 * | 8/2016 | Joseph | B01D 11/0407 |
| 2018/0185768 A1 * | 7/2018 | Stantchev | A61K 36/00 |
| 2019/0264132 A1 * | 8/2019 | Nates | C11B 1/02 |
| 2020/0406164 A1 * | 12/2020 | Blank | B01D 11/0207 |
| 2020/0406167 A1 * | 12/2020 | Cacace | C02F 1/025 |
| 2021/0052993 A1 * | 2/2021 | Moss | B01D 11/0215 |

* cited by examiner

| TIME (min) | COLUMN #1 | COLUMN #2 | COLUMN #3 | COLUMN #4 | COLUMN #5 | COLUMN #6 | TIME (min) |
|---|---|---|---|---|---|---|---|
| 0 | Loading 1st batch | | | | | | 0 |
| 10 | Flooding | COLUMN #2 | | | | | 10 |
| 20 | Flooding | Loading 2nd batch | | | | | 20 |
| 30 | Warming | Flooding | COLUMN #3 | | | | 30 |
| 40 | Warming | Flooding | Loading 3rd batch | | | | 40 |
| 50 | Processing | Warming | Flooding | COLUMN #4 | | | 50 |
| 60 | Processing | Warming | Flooding | Loading 4th batch | | | 60 |
| 70 | Processing | Processing | Warming | Flooding | COLUMN #5 | | 70 |
| 80 | Processing | Processing | Warming | Flooding | Loading 5th batch | | 80 |
| 90 | Cooling | Processing | Processing | Warming | Flooding | COLUMN #6 | 90 |
| 100 | Cooling | Processing | Processing | Warming | Flooding | Loading 6th batch | 100 |
| 110 | Unloading/Loading 7th batch | Cooling | Processing | Processing | Warming | Flooding | 110 |
| 120 | Unloading/Loading 7th batch | Cooling | Processing | Processing | Warming | Flooding | 120 |
| 130 | Flooding | Unloading/Loading 8th batch | Cooling | Processing | Processing | Warming | 130 |
| 140 | Flooding | Unloading/Loading 8th batch | Cooling | Processing | Processing | Warming | 140 |
| 150 | Warming | Flooding | Unloading/Loading 9th batch | Cooling | Processing | Processing | 150 |
| 160 | Warming | Flooding | Unloading/Loading 9th batch | Cooling | Processing | Processing | 160 |
| 170 | Processing | Warming | Flooding | Unloading/Loading 10th batch | Cooling | Processing | 170 |
| 180 | Processing | Warming | Flooding | Unloading/Loading 10th batch | Cooling | Processing | 180 |
| 190 | Processing | Processing | Warming | Flooding | Unloading/Loading 11th batch | Cooling | 190 |
| 200 | Processing | Processing | Warming | Flooding | Unloading/Loading 11th batch | Cooling | 200 |
| 210 | Cooling | Processing | Processing | Warming | Flooding | Unloading/Loading 12th batch | 210 |
| 220 | Cooling | Processing | Processing | Warming | Flooding | Unloading/Loading 12th batch | 220 |
| 230 | Unloading/Loading 13th batch | Cooling | Processing | Processing | Warming | Flooding | 230 |
| 240 | Unloading/Loading 13th batch | Cooling | Processing | Processing | Warming | Flooding | 240 |
| 250 | Flooding | Unloading/Loading 14th batch | Cooling | Processing | Processing | Warming | 250 |
| 260 | Flooding | Unloading/Loading 14th batch | Cooling | Processing | Processing | Warming | 260 |
| 270 | Warming | Flooding | Unloading/Loading 15th batch | Cooling | Processing | Processing | 270 |
| 280 | Warming | Flooding | Unloading/Loading 15th batch | Cooling | Processing | Processing | 280 |
| 290 | Processing | Warming | Flooding | Unloading/Loading 16th batch | Cooling | Processing | 290 |
| 300 | Processing | Warming | Flooding | Unloading/Loading 16th batch | Cooling | Processing | 300 |
| 310 | Processing | Processing | Warming | Flooding | Unloading/Loading 17th batch | Cooling | 310 |
| 320 | Processing | Processing | Warming | Flooding | Unloading/Loading 17th batch | Cooling | 320 |
| 330 | Cooling | Processing | Processing | Warming | Flooding | Unloading/Loading 18th batch | 330 |
| 340 | Cooling | Processing | Processing | Warming | Flooding | Unloading/Loading 18th batch | 340 |
| 350 | Unloading/Loading 19th batch | Cooling | Processing | Processing | Warming | Flooding | 350 |
| 360 | Unloading/Loading 19th batch | Cooling | Processing | Processing | Warming | Flooding | 360 |
| 370 | Flooding | Unloading | Cooling | Processing | Processing | Warming | 370 |
| 380 | Flooding | Unloading | Cooling | Processing | Processing | Warming | 380 |
| 390 | Warming | | Unloading | Cooling | Processing | Processing | 390 |
| 400 | Warming | | Unloading | Cooling | Processing | Processing | 400 |
| 410 | Processing | | | Unloading | Cooling | Processing | 410 |
| 420 | Processing | | | Unloading | Cooling | Processing | 420 |
| 430 | Processing | | | | Unloading | Cooling | 430 |
| 440 | Processing | | | | Unloading | Cooling | 440 |
| 450 | Cooling | | | | | Unloading | 450 |
| 460 | Cooling | | | | | Unloading | 460 |
| 470 | Unloading | | | | | | 470 |
| 480 | Unloading | | | | | | 480 |

Fig. 10

MULTIPLE-STREAM PRESSURIZED LOW POLARITY WATER EXTRACTION APPARATUS, SYSTEM, AND METHODS OF USE

CROSS-REFERENCE TO RELATED APPLICATIONS

This application is a national stage entry of International Application No. PCT/CA2019/050284, filed Mar. 8, 2019, and claims priority to Canadian Application 2,997,848 filed Mar. 9, 2018, both of which are incorporated herein by reference in their entirety.

TECHNICAL FIELD

Various embodiments disclosed herein generally relate to equipment, apparatus, and systems for extraction of components from biomass feedstocks. More specifically, this disclosure pertains to equipment, apparatus, and systems for generation and use of multiple parallel streams of pressurized low polarity water as solvents for extractions of components from biomass feedstocks.

BACKGROUND

Phytochemicals are chemical compounds that occur naturally in plants and are among other things, responsible for color such as exemplified by the deep purple of blueberries and organoleptic properties such as exemplified by the smell of garlic. Some phytochemicals are used in nutraceutical products that are generally sold in medicinal forms not usually associated with food.

There are three classes of phytochemicals that are of particular interest i.e., polyphenols, specialty carbohydrates, and glycosides. Polyphenols, also referred to as phenolics, are compounds that function mainly as antioxidants and anti-inflammatories when ingested by humans. Polyphenols can be synthesized industrially, but they are mainly made available by extraction from plants and microorganisms.

The current approach to the extraction of plant components is through use of either organic solvents or unpressurized hot water to solubilise and remove phytochemicals from plant biomass. The organic solvent systems commonly use one or more of ethanol, methanol, ethyl acetate and acetone. However, organic solvents are generally toxic and their commercial use requires explosion-proof facilities provided with storage and handling equipment certified for use with toxic and flammable chemicals. Furthermore, solvents may remain in final products as unhealthy trace compounds and their toxic properties raise safety concerns for human consumption.

It is well-known that hot-water systems tend to be less efficient than organic solvent-based systems and are able to only extract a portion of the potentially available phytochemicals from plant biomass. It is also well-known that heating water under pressure to temperatures above its boiling point results in alteration of its key properties such as pH and polarity and decreases its dielectric constant to values that approximate those of solvents such as those exemplified by ethanol and methanol. Such pressurized hydrothermal processes may be referred to as autohydrolysis and hydrothermolysis include steam explosion, pressurized low polarity water (PLPW; also commonly referred to as superheated water, subcritical water, pressurized hot water, compressed hot water). Such hydrothermal processes cause the catalytic action of hydronium ions from water ionization that occurs during controlled and concurrently increased temperatures and pressures over selected time periods to produce in situ acids such as acetic acid generated from acetyl groups in the plant biomass, that will hydrolyse the polysaccharides and lignins comprising the biomass thereby releasing and further breaking down biomass into its constituent components.

Recently, a pressurized low polarity water (PLPW) system has been scaled-up to process 50-kg batches of plant material in about 1.5 hrs with about 500 L of PLP water (Canadian Patent No. 2,836,200). The problem is that although the PLPW system disclosed in CA 2,836,200 provided a number of extraction chambers interconnected to PLPW equipment, only one extraction chamber at a time can be used to process a 50-kg batch of plant material. The other extraction chambers can only be processed sequentially and not concurrently. A 7-step process is required to process a 50-kg batch of plant material and includes the steps of: (1) filling an extraction chamber with plant material, then running the (2) flooding, (3) warming, (4) processing, and (5) cooling cycles through the plant material, and then (6) removing the spent plant material, and finally (7) cleaning and washing the extraction chamber. The total amount of time required to complete all 7 steps is on the order of 7-8 hrs, and therefore limits the total volume of plant material that can be processed with the CA 2,836,200 system in an 8-hr work shift.

SUMMARY

The present disclosure pertains to apparatus for generating pressurized low polarity (PLP) water and use thereof for extraction and recovery of components from biomass feedstocks. The embodiments of the multiple-stream pressurized low polarity water (PLPW) extraction apparatus disclosed herein may be configured with four or more reaction columns, wherein each column is in separate communication with: (i) a supply of heated water, (ii) a first supply of heated pressurized water, (iii) a second supply of heated pressurized water, and (iv) a supply of cooled pressurized water, wherein each column having an outlet for egressing a liquids product flow, whereby one of the reaction columns may receive a flow of heated pressurized water from the first supply of heated pressurized water while a second of the reaction columns is receiving a flow of heated pressurized water from the second supply of heated pressurized water.

After loading a plant biomass feedstock into two or more selected reaction columns, components comprising the plant biomass are extracted and recovered from each column with a five-step process comprising sequentially flowing four separate circuits of water through each column. Initially the first column is loaded with fresh biomass feedstock and the apparatus is energized. After energizing is completed, the process comprises a first step of flooding the column with pressurized water, a second step of warming the column and its contents, a third step of processing the biomass materials within the column with PLP water, a fourth step of cooling the column with pressurized cool water, and a fifth step of draining the column and removing the spent biomass material. The column may then be refilled with fresh biomass feedstock. The water comprising the extracted components, i.e., a liquids product flow, is collected from the column during the third step in one or more aliquots.

According to some embodiments of the present disclosure, the four or more reaction columns of the multiple-stream pressurized low polarity water (PLPW) extraction apparatus are provided with and are in communication with piping infrastructures, pumps, heat exchangers, auxiliary heaters, and valves that are configured to cooperate such that the five-step extraction process can proceed concurrently at least in two of the four or more reaction columns.

BRIEF DESCRIPTION OF THE DRAWINGS

The present invention will be described in conjunction with reference to the following drawings in which:

FIG. 10 is a process timeline chart of the throughout during an 8-hr day through a 6-column multiple-stream PLPW system according to one embodiment of the present disclosure using a 40-min PLPW extraction period for each column;

DETAILED DESCRIPTION

Figure 1:
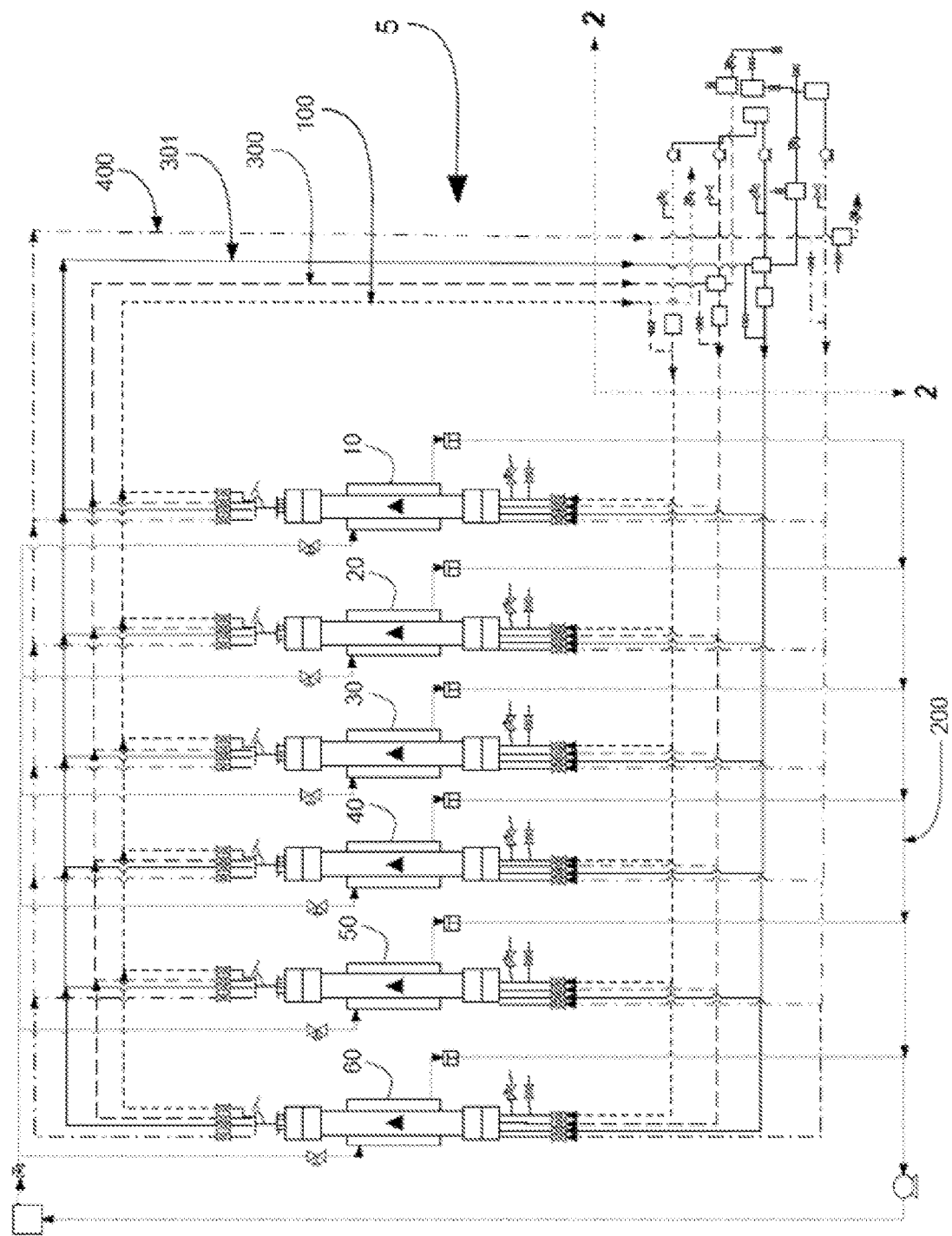
FIG. 1 is a schematic diagram showing, according to one embodiment of the present disclosure, an example of a multiple-stream pressurized low polarity water (PLPW) extraction system having six extraction columns and four independent process circuits wherein each extraction column is in fluid communication with each of the independent process circuits whereby two or more of the extraction columns can receive in parallel a flow of PLPW water therethrough.

The exemplary embodiments of present disclosure pertain to apparatus and systems for generating multiple parallel lines (or streams) of pressurized low polarity (PLP) water and use thereof for concurrent extraction and recovery of components, also referred to herein as phytochemicals, from biomass feedstocks contained within a plurality of reactor columns.

An example of a system and apparatus according this disclosure is shown in FIGS. 1-7 wherein the multiple-stream PLPW apparatus 5 comprises six extraction/reaction columns 10, 20, 30, 40, 50, 60 set up in parallel. Generally, the PLPW process pressurizes preconditioned water to approximately 750 psi, and then raises the temperature of the pressurized water to approximately 180° C. before passing the heated and pressurized water in parallel through two or more selected reaction columns to extract phytochemicals from a selected feedstock.

As used herein, the term "phytochemical" means a chemical produced by a plant during its primary and/or secondary metabolism. Phytochemicals include among other things, carotenoids, polyphenols, antioxidants, phenolic acids, flavonoids, stilbenes, lignans, anthocyanins, flavones, isoflavones, flavanols, catechins, epicatechins, proanthocyanidins, isothiocyanates, allyl sulfides, indoles, protease inhibitors, terpenes, saponins, allicins, lycopene, lutein, reseveratrol, cannabinoids, and the like.

The term "preconditioned water" as used herein includes water that has been heated to a temperature selected from the range of about 30° C. to about 90° C. and therebetween for example between about 40° C. to about 80° C., about 50° C. to about 70° C., and/or water that has been purified by filtration to remove among other things particulates, organic molecules, microorganisms, and the like, and/or deionized water and/or water that has been conditioned by reverse osmosis. Additionally or alternatively, preconditioned water may include mixtures of water and alcohols that are known to be food-safe, for example ethanol, propanol, and the like. Suitable concentrations of a selected alcohol in water may be selected from a range of 5% to 80%, 5% to 70%, 10% to 60%, 20% to 50%, 30% to 40%, and therebetween. Additionally or alternatively, preconditioned water may include mixtures of water and organic acids that are known to be food-safe, for example formic acid, acetic acid, propionic acid, butyric acid, valeric acid, lactic acid, malic acid, citric acid, benzoic acid, carbonic acid, sorbic acid, and the like. Suitable mixtures of one or more selected afore-mentioned organic acids with water may be selected from a range of about 0.001 mg/mL to about 1.25 mg/mL. Those skilled in this art will be able to determine a suitable mixture range for a selected organic acid in water based on the selected organic acid's known chemical properties. For example, suitable ranges may be about 0.01 mg/mL to about 1.0 mg/mL, about 0.02 mg/mL to about 0.8 mg/mL, about 0.03 mg/mL to about 0.6 mg/mL, about 0.04 mg/mL to about 0.5 mg/mL, and therebetween.

The capacity of the multiple-stream PLPW apparatus disclosed herein is referred to in terms of providing a flow rate into each of the selected reaction columns from the range of about 2 L/min to about 30 L/min, about 4 L/min to about 20 L/min, about 6 L/min to about 15 L/min, about 8 L/min to about 12 L/min, about 10 L/min. To facilitate economical operation, the multiple-stream PLPW apparatus may be operated as a semi-continuous process wherein two or more reaction columns are always being processed by separate supplies of PLP water and there is a continuous flow of PLPW extract from the system from each of the two or more reaction columns, while one or more unprocessed reaction columns is being unloaded or washed or loaded or serviced.

Process and Apparatus Description:

The multiple-stream PLPW apparatus 5 shown in FIGS. 1-7 comprises four independent process circuits 100 (FIGS. 1, 2, 3), 200 (FIGS. 1, 2, 4), 300 (FIGS. 1, 2, 5), 400 (FIGS. 1, 2, 7) that control the flow of PLPW through each reactor column 10, 20, 30, 40, 50, 60. The flow circuit for each reactor column 10, 20, 30, 40, 50, 60 is selected by an automated control system that controls the sequencing of valve operation within each reactor column circuit. The term "heater" is used to identify the equipment used to heat the process water and encompasses an "immersion heater" or a "shell and tube heat exchanger" that may be connected to a plant steam system.

Circuit Bypass Mode:

The PLPW apparatus 5 is provided with a circuit bypass mode (FIGS. 2, 2A) which enables isolation of one or more or all of the individual reactor column circuits from the rest of the PLPW apparatus. Any one of the circuit pumps 120, 320, 321, 420 flows water from a reservoir 110, 410 through: (i) the input side of a heat exchanger 325, 326, (ii) a heater 330, 331, (iii) the output side of the heat exchanger 325, 326, (iv) a secondary heat exchanger 360, 361, 460, (v) the back pressure regulator 165, 365, 366, 465, and then to (vi) the reservoir 310 or to a waste water drain. Each of the water lines egressing from the circuit pumps 120, 320, 321, 420 is provided with a pressure relief valve 170, 370, 371, 470. The purpose of the circuit bypass mode is to pressurize and maintain the system pressure, and to adjust the pressurized low polarity (PLP) water temperature before the PLP water is introduced into the other circuits.

Flooding Circuit 100:

A selected reactor column filled with a biomass feedstock to be extracted, is flooded with hot water below 100° C. and then pressurized. The flooding circuit 100 (FIGS. 2, 3) comprises a pump 120 for pushing water from a first water reservoir 110 through a heater 140, into and through the selected column, that is one of 10, 20, 30, 40, 50, 60, then through to and through a back pressure regulator 160 and out of the system to a waste water drain. A flooding pressure relief valve 170 may be provided interposed the pump 120 and the heater 140 if so desired. The flow of flooding hot water into the selected column 10, 20, 30, 40, 50, 60 is controlled by the one of valves 141, 142, 143, 144, 145, 146, respectively. The flow of flooding hot water out of the selected column 10, 20, 30, 40, 50, 60 is controlled by the one of valves 151, 152, 153, 154, 155, 156, respectively. The flooding circuit 100 additionally comprises a bypass valve 135 to isolate the columns 10, 20, 30, 40, 50 60 from the flooding circuit 100.

Warming Circuit:

The warming circuit 200 (FIG. 4), comprises a boiler 270 from which steam is flowed into the jackets of columns 10, 20, 30, 40, 50, 60. The flow of steam from the boiler 270 into the warming circuit is controlled by a steam inlet valve 280. The flow of steam from the warming circuit 200 into the jackets of columns 10, 20, 30, 40, 50, 60 is controlled by steam control valves 210, 220, 230, 240, 250, 260, respectively. The jackets of columns 10, 20, 30, 40, 50, 60 are provided with steam traps 215, 225, 235, 245, 255, 265, respectively, wherein steam egressing from the columns 10, 20, 30, 40, 50, 60, respectively is condensed prior to flowing back into the warming circuit 200. A condensate return pump 290 pushes the condensate back into the boiler 270.

The purpose of the warming circuit 200 is to warm one or more selected columns 10, 20, 30, 40, 50, 60 to a selected desired processing temperature to minimize the loss of heat from PLP water by thermal conductivity to the columns and piping infrastructure interconnecting the columns with the utilities equipment during an extraction process.

Figure 5:
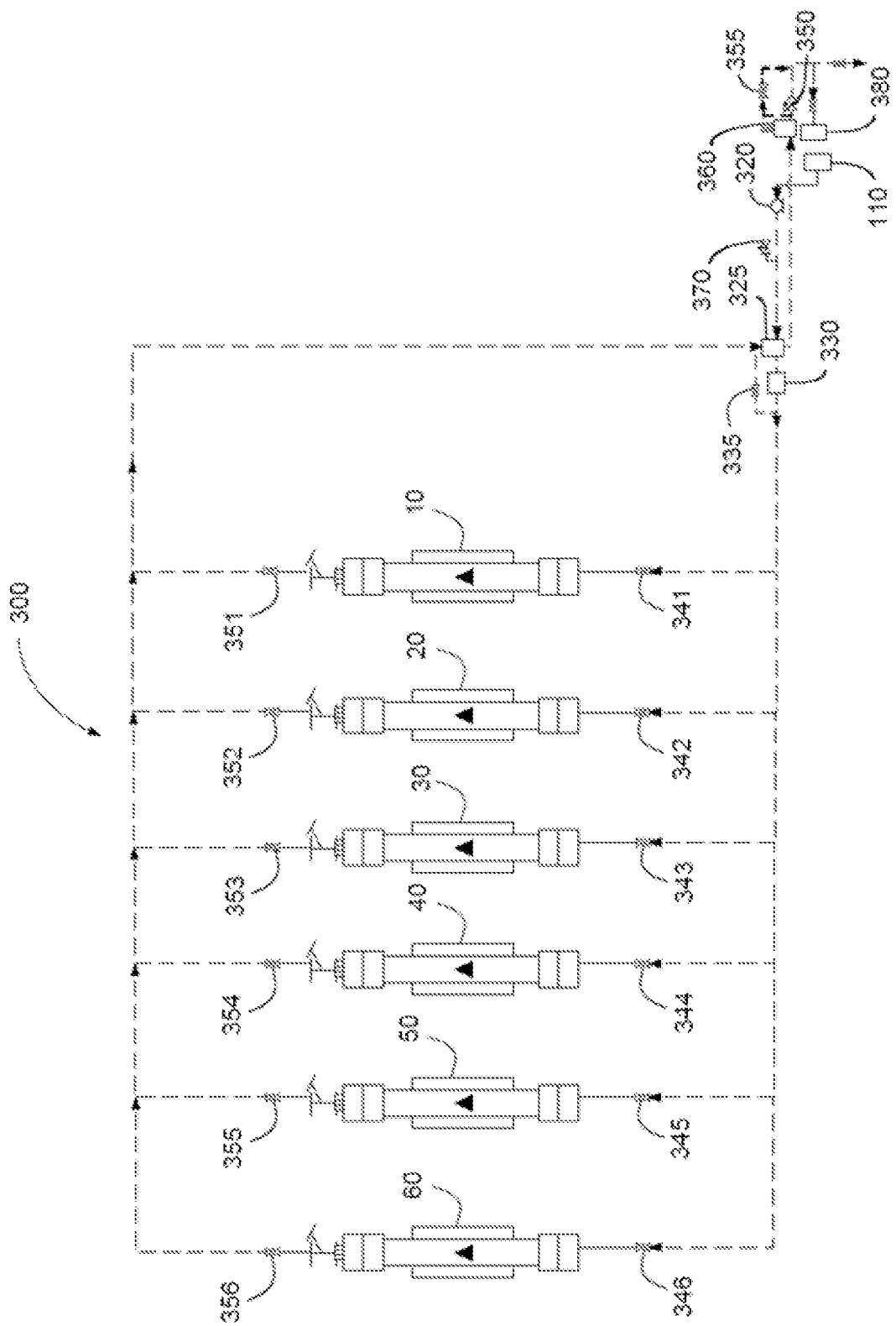
FIG. 5 is a schematic diagram of an example of a first processing circuit for the six-column PLPW system shown in FIG. 1.
Figure 8:
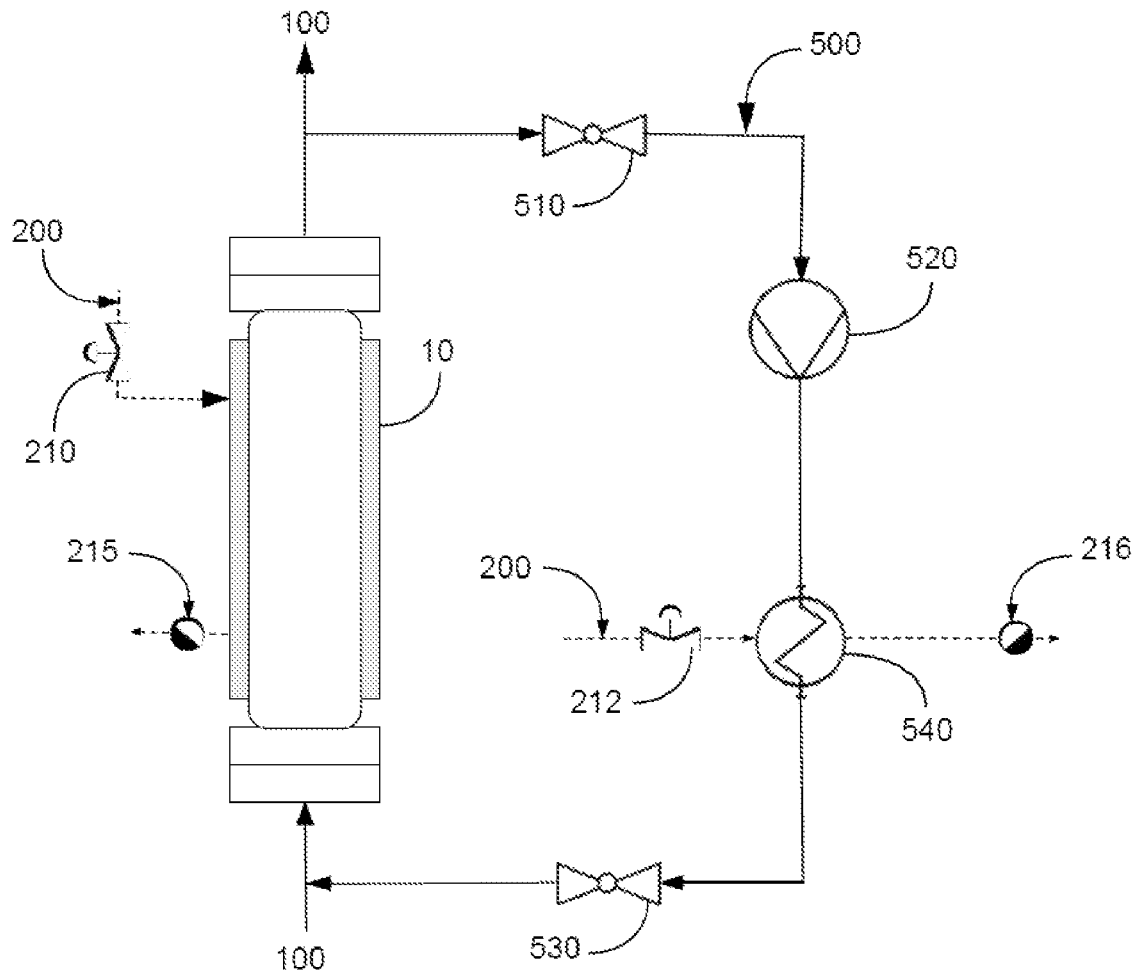
FIG. 8 is a schematic flowchart showing an example of an optional supplementary warming circuit that could be incorporated in the PLPW system to reduce the amount of time required for heating plant biomass during flooding/warming circuits prior to proceeding with a processing circuit.

It is optional if so desired, to provide the columns 10, 20, 30, 40, 50, 60 with a supplementary warming circuit 500 as illustrated with column 10 in FIG. 8. The supplementary warming circuit 500 could be configured with sensors and controls (not illustrated) to activate when the warming circuit 200 (FIG. 4) commences with a flow of steam through steam control valve 210 into the jacket of column 10 during the flooding circuit 100 (FIG. 5). Valve 151 (FIG. 5) would remain in a closed position while valves 510, 530 (FIG. 8) are opened thereby diverting the flow of flooding water egressing from the top of column 10 into the supplementary warming circuit 500 which then pumped into the bottom of the column 10 by pump 520. Addition of the supplementary warming circuit 500 (FIG. 8) facilitates even heat distribution throughout the plant biomass being flooded in the column 10 while the plant biomass is being warmed by the warming circuit 200. If so desired, a heat exchanger 540 (FIG. 8) receiving a flow of steam from the warming circuit 200 through a steam control valve 212 can be provided to supply additional heat to the flooding water in the supplementary warming circuit 500 prior to its return into the bottom of the column 10, thereby reducing the time required to bring the plant biomass to a selected desired temperature prior to commencing the flows of PLP water through the first and/or second processing circuits through column 10. Condensate and steam egressing from the heat exchanger 540 is returned to the warming circuit through steam trap 216.

First Processing Circuit:

During the first processing circuit 300 (FIGS. 2, 5), a first processing pump 320 pushes water from the first water reservoir 110 through the input side of a heat exchanger 325, then through a heater 330, after which the PLP water flows (under pressure from the first processing pump 320) through one of valves 341, 342, 343, 344, 345, 346 respectively into a selected one of columns 10, 20, 30, 40, 50, 60 that is packed with biomass feedstock to be extracted. The PLP water flows out of the selected column through the one of valves 351, 352, 353, 354, 355, 356 respectively into and through the output side of a first processing heat exchanger 325, then to and through a secondary heat exchanger 360, through a back pressure regulator 365, and out of the system to the collection vessel 380. The first processing circuit 300 additionally comprises a bypass valve 335 to isolate the columns 10, 20, 30, 40, 50, 60 from the processing circuit. The purpose of the first processing circuit 300 (FIGS. 2, 5) is to solubilise and extract the compounds of interest from the feedstock material. The PLP water travels through the selected reaction column 10, 20, 30, 40, 50, 60 from bottom to the top in a single pass. The least concentrated water first passes through the most extracted feedstock material, thus maximizing the amount of product extracted. Additionally, due to the continuous flow-through nature of the extraction system, product is constantly removed from the system with low residence times while exposed to the operating conditions, thus reducing the amount of potential product degradation.

Second Processing Circuit:

During the second processing circuit 301 (FIGS. 2, 6), a second processing pump 321 pushes water from the first water reservoir 110 through the input side of a heat exchanger 326, then through a heater 331, after which the PLP water flows (under pressure from the second processing pump 321) through one of valves 341a, 342a, 343a, 344a, 345a, 346a respectively into a selected one of columns 10, 20, 30, 40, 50, 60 that is packed with biomass feedstock to be extracted. The PLP water flows out of the selected column through the one of valves 351a, 352a, 353a, 354a, 355a, 356a respectively into and through the output side of a first processing heat exchanger 326, then to and through a secondary heat exchanger 361, through a back pressure regulator 366, and out of the system to the collection vessel 380. The first processing circuit 301 additionally comprises a bypass valve 336 to isolate the columns 10, 20, 30, 40, 50, 60 from the processing circuit. The purpose of the second processing circuit 300 (FIGS. 2, 6) is to, in parallel to the first processing circuit wherein compounds of interest in a first batch of the feedstock material are being solubilised and extracted in one of selected columns 10, 20, 30, 40, 50, 60, concurrently solubilize and extract the compounds of interest from a second batch of the feedstock material in another selected column 10, 20, 30, 40, 50, 60.

Cooling Circuit:

The last processing circuit, the cooling circuit 400 (FIG. 7) cools down the reaction columns after the feedstock material has been fully extracted in two stages. In the cooling circuit 400, the PLP water flows through the reaction column packed with the extracted feedstock material whereby the pump 420 pushes water from the cooling water storage tank 410 into the selected column 10, 20, 30, 40, 50, 60 through one of valves 441, 442, 443, 444, 445, 446, then out of the column through the one of valves 451, 452, 453, 454, 455, 456 respectively to and through the output side of a heat exchanger 460, and then through the back pressure regulator 465, and out of the system to the drain. The purpose of the cooling circuit is to lower the temperature of the extracted feedstock material and the reaction column to a level below the saturation temperature to enable safe removal of the extracted feedstock. Once the temperature is low enough, the system can be switched back to the cooling circuit 100 and the selected column 10, 20, 30, 40, 50, 60 can be drained of water, the extracted feedstock removed, and fresh material added for the next extraction run.

Empty/Reload:

After the extraction process is complete, the pressurized reaction column must be depressurized and the water evacuated before the reaction column is opened for unloading of the processed biomass feedstock. It is optional to load the biomass feedstock into one or more sleeves that are inserted into the reaction column for processing after which, the sleeves are removed from the reaction column, and the biomass is removed from the sleeves. Alternatively, the biomass may be loaded directly into the reaction column and recovered therefrom after processing. It is optional to provide a compressed air supply or a water supply or a steam supply to push spent biomass feedstock out of the reaction column to facilitate its unloading.

It is to be noted that those skilled in these arts will be able to adjust and/or modify the various equipment options disclosed herein for producing a multiple-stream PLPW apparatus that comprises at least three reaction columns wherein each column is provided with piping infrastructures communicating with at least a water supply, one or more heaters or heat exchangers for heating the water, and pumps for pressurizing the water to a temperature in the range of about 50° C. to about 65° C., from about 50° C. to about 85° C., from about 50° C. to about 100° C., from about 50° C. to about 125° C., from about 55° C. to about 150° C., from about 55° C. to about 175° C., from about 55° C. to about 185° C., from about 55° C. to about 195° C., from about 55° C. to about 205° C., from about 55° C. to about 225° C., from about 55° C. to about 250° C., from about 55° C. to about 275° C., from about 55° C. to about 300° C., from about 55° C. to about 325° C., from about 55° C. to about 350° C., from about 55° C. to about 375° C., from about 55° C. to about 400° C., and therebetween, and a pressure from the range of about 100 psi to about 500 psi, from about 125 psi to about 450 psi, from about 150 psi to about 400 psi, from about 165 psi to about 375 psi, from about 175 psi to about 350 psi, from about 175 psi to about 325 psi, from about 175 psi to about 300 psi, from about 175 psi to about 275 psi, from about 175 psi to about 250 psi, from about 175 psi to about 225 psi, and therebetween.

The multiple-stream PLPW apparatus disclosed herein may be configured with four reaction columns, five reaction columns, six reaction columns, seven reaction columns, eight reaction columns, nine reaction columns, ten reaction columns, or more reaction columns if so desired. It is within the scope of the present disclosure to provide backup supplies of pressurized water, pressurized heated water, and pressurized cooling water.

The multiple-stream PLPW apparatus may additionally comprise water purification equipment for receiving and processing therein the waste water stream egressing from the reaction columns during each initial warm-up circuit, flooding circuit, warming circuit, and cooling circuit, and then recycling the processed water back into one or more of the flooding circuit, warming circuit, and cooling circuit.

The multiple-stream PLPW apparatus disclosed herein are suitable for extraction and recovery of components from biomass feedstocks exemplified by lignocellulosic materials such as fruit pulps, vegetable pulps, pomaces, root materials, vegetative materials, woody materials, straws, herbaceous materials, seeds, nuts, meals, bagasse, and the like. The multiple-stream PLPW apparatus are also suitable for extraction and recovery of components from non-plant biomass materials exemplified by algal biomass, fish meals, and the like.

EXAMPLES

Figure 9:
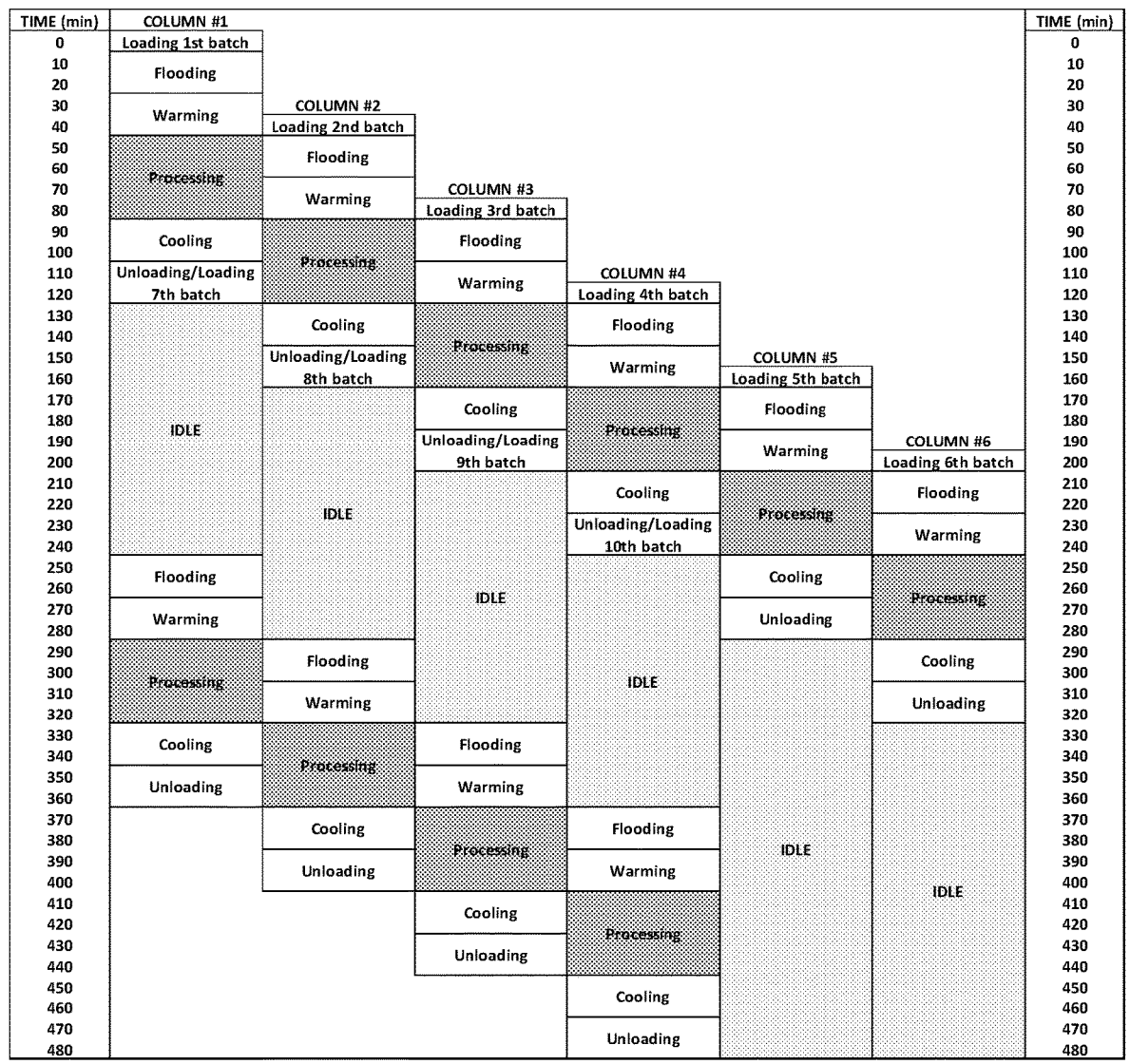
FIG. 9 is a process timeline chart of the throughout during an 8-hr day through a 6-column prior art single-stream PLPW system using a 40-min PLPW extraction period for each column.

Example 1: Comparison of a Single-Stream 6-Column PLPW Processing System with a Multiple-Stream 6-Column PLPW Processing System, Both Having a 40-Min PLPW Processing Step in Each Column FIG. 9 is process timeline chart during an 8-hr day (480 min) for the throughput of a single-stream PLPW system (prior art) configured with six reaction columns as set out in the disclosure in CA 2,836,200 (in reference to FIGS. 2 and 2A, with the addition of a sixth column to the five columns depicted) wherein a single supply of PLPW is provided by the apparatus to all six reaction columns. In comparison, FIG. 10 is a process timeline chart during an 8-hr day (480 min) for the throughput of a multiple-stream PLPW system according to the present disclosure in reference to present FIGS. 1-7.

The assumptions for PLPW process timelines illustrated in FIGS. 8 and 9 were: (i) each of the six columns is loaded with 10 kg of biomass feedstock, (ii) the first batch into each column requires 10 min to load, (iii) the time required for the flooding with preconditioned water is 20 min, (iv) the time to warm the flooded column to a selected temperature is 20 min after which, (v) the column is processed with PLP water for a 40-min period during which time solubilisation and extraction of the components occurs, (vi) release from the PLP conditions and cooling the extracted biomass feedstock for 20 min, after which (vii) the extracted biomass is unloaded from the column (10 min is allocated for the unloading step). In summary, the PLPW process through each of the columns in the prior art system of CA 2,836,200 and each of the columns in the apparatus and systems according to the present disclosure, comprises 6 steps and requires 120 mins to complete. The configuration of the CA 2,836,200 system enables switching of the PLP water flow from each column at the end of the PLP water extract step in that column. As shown in FIG. 9, the flow of PLP water can be switched from the first column to the second column 80 min. after the flooding step is started in the first column, and that the flow of PLP water in the process done in sequence through all six columns configured as taught in the prior art system, requires 240 min (4 h) from when the flow is first initiated in the first column and is completed in the sixth column. In the meantime, the remaining process steps in the first column with the first batch of biomass feedstock can be completed in 40 min after which it is ready for commencement of a repeat of the process steps with the seventh batch of biomass feedstock starting with flooding and warming. However, the flooding and warming steps cannot be started in the first column with the seventh batch of biomass feedstock, until the flooding and warming steps have been completed in the sixth column with the sixth batch of biomass feedstock. As a consequence, the first column has to remain idle for 120 min after it is ready for the processing steps. Because of the sequential processing of each column, only four of the six columns can be used in an 8-hr period to process a second batch of biomass feedstock with the end result that the prior art PLPW system in this example with a 40-min PLPW processing step, will throughput only ten 10-kg batches of biomass feedstock, i.e., 100 kg in an 8-h period.

Figure 2:
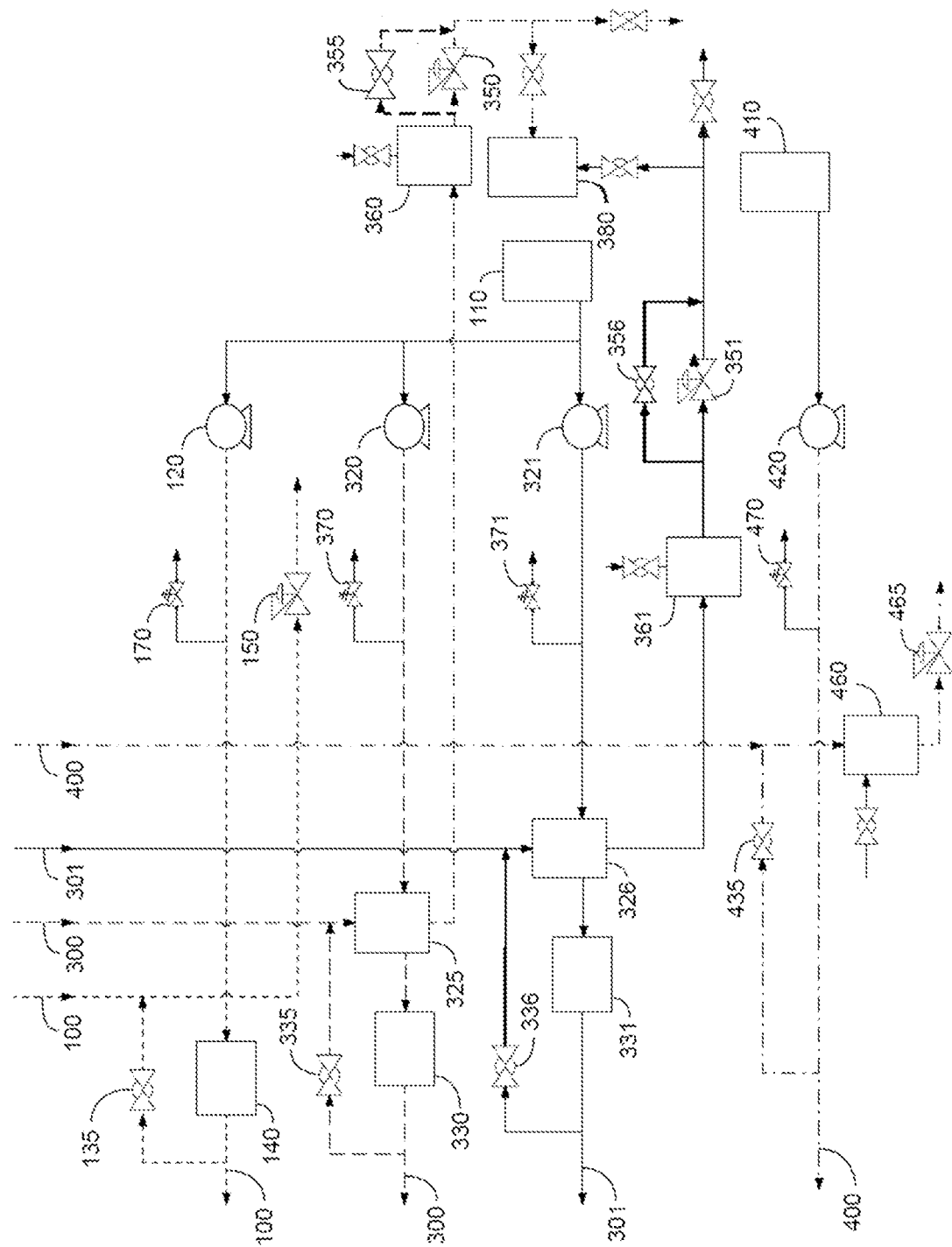
FIG. 2 is a close-up view of section 2 from FIG. 1.
Figure 3:
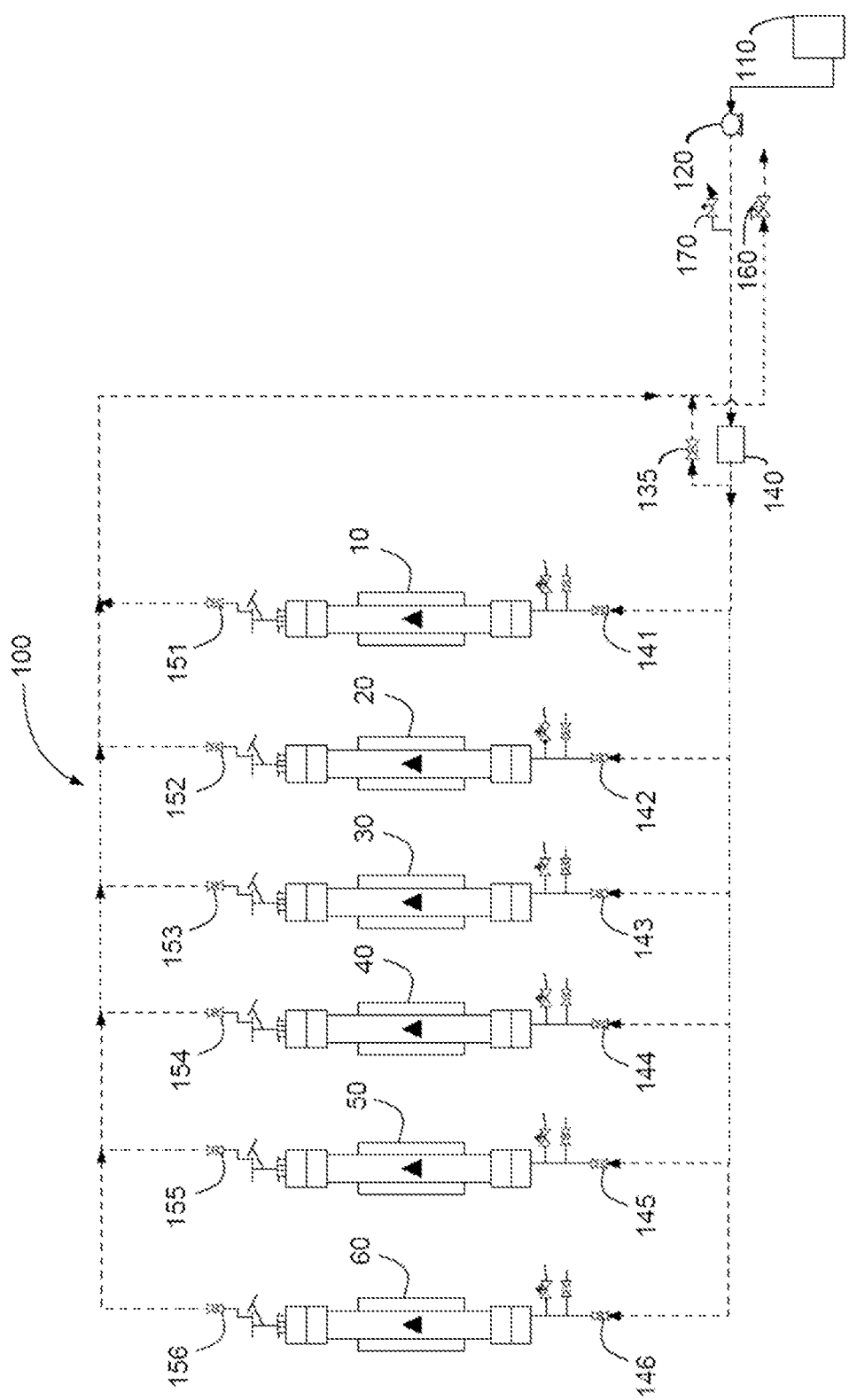
FIG. 3 is a schematic diagram of an example of a flooding circuit for the six-column PLPW system shown in FIG. 1.
Figure 4:
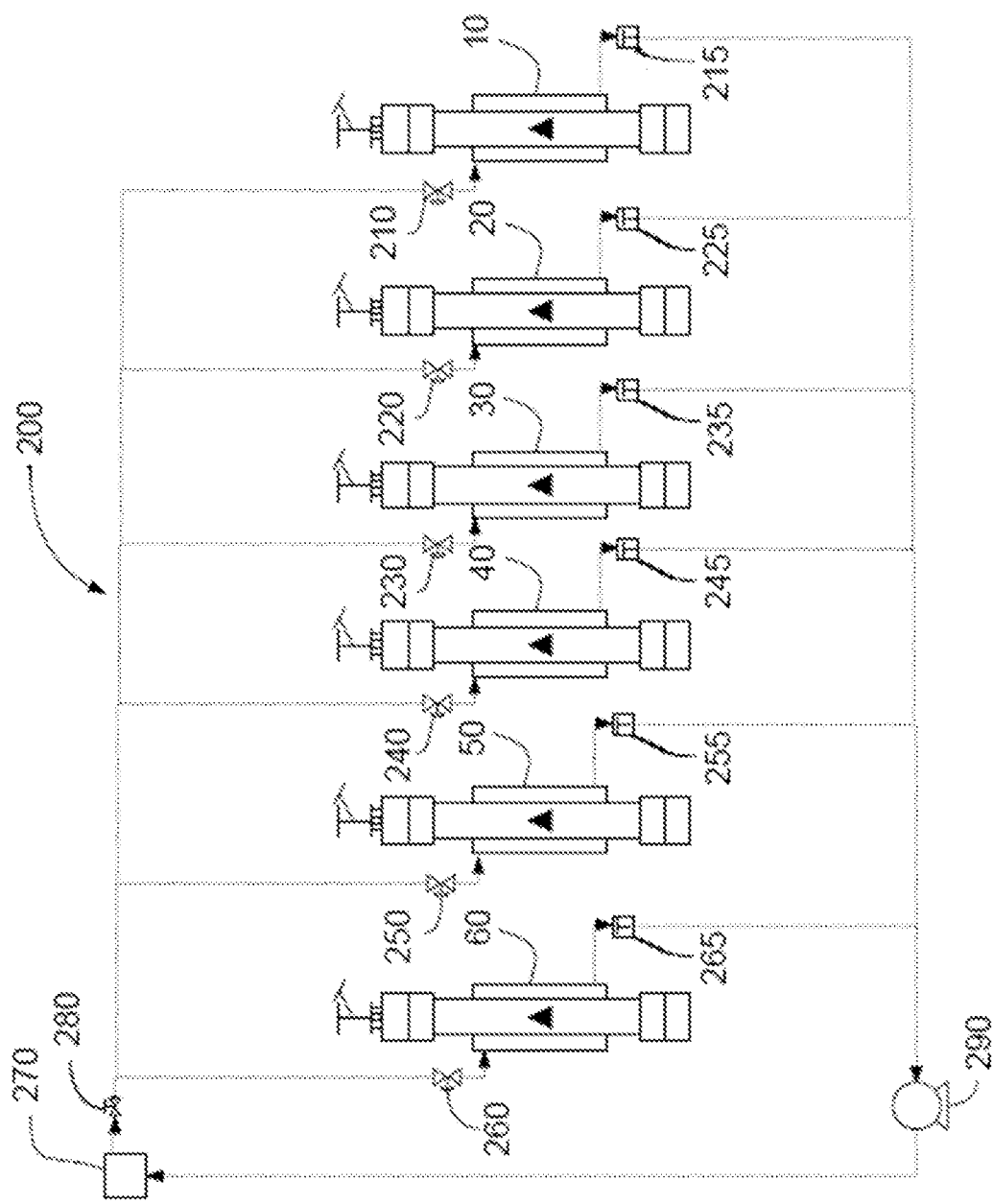
FIG. 4 is a schematic diagram of an example of a warming circuit for the six-column PLPW system shown in FIG. 1.
Figure 6:
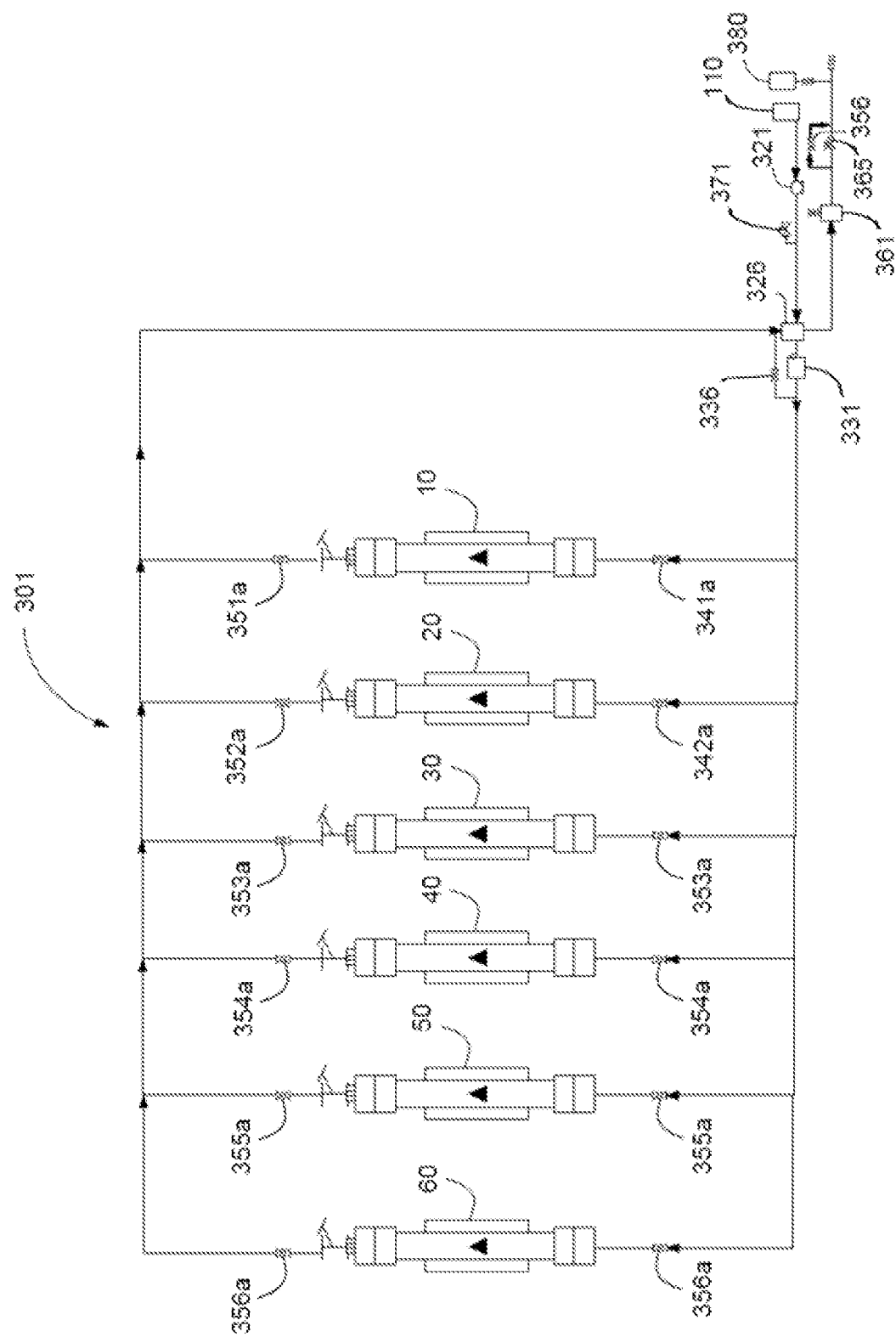
FIG. 6 is a schematic diagram of an example of a second processing circuit for the six-column PLPW system shown in FIG. 1.
Figure 7:
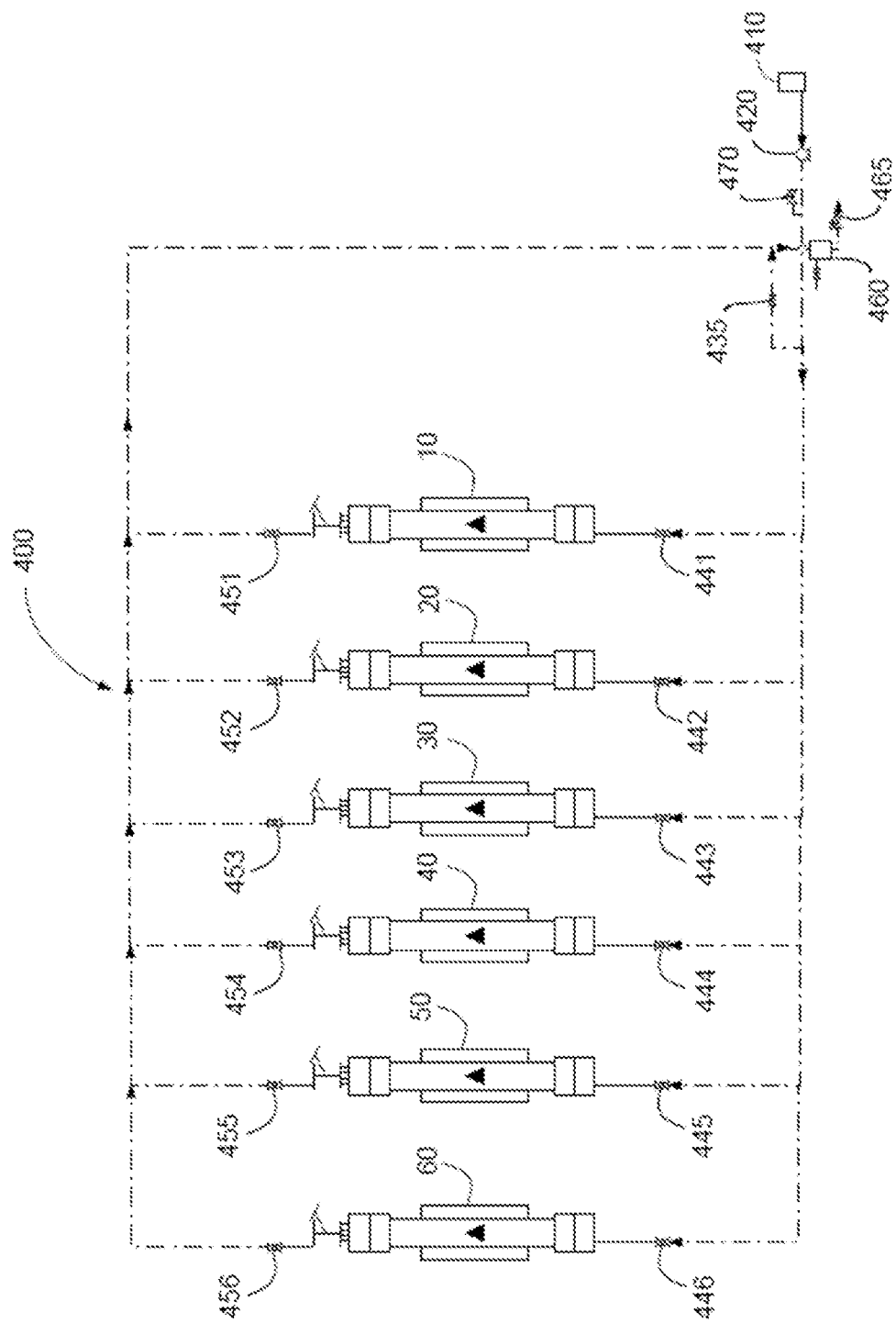
FIG. 7 is a schematic flowchart for an example of a cooling circuit for the six-column PLPW system shown in FIG. 1.

The PLPW system disclosed in this example provides a second PLPW circuit that is interconnected to each of the six columns (FIGS. 1, 2, 6). As shown in FIG. 10, as soon as the first column has been loaded with the first batch of biomass feedstock and the flooding and warming steps have commenced in the first column, the second column can be loaded with the second batch of biomass feedstock and the flooding and warming steps commenced in the second column. After completion of the flooding and warming steps have been completed in the first column, it then receives a flow of PLP water from the first PLPW circuit 300 (FIGS. 1, 2, 5). After completion of the flooding and warming steps have been completed in the second column, it then receives a flow of PLP water from the second PLPW circuit 301 (FIGS. 1, 2, 6) starting about 20 min after the flow of PLP water from the first PLPW circuit 300 into the first column.

In the meantime, the third column can be loaded with the third batch of biomass feedstock as soon as the flooding and warming steps have commenced in the second column, such that the flooding and warming steps in the third column commence at the same time that the flow of PLP water commences through the first column. Consequently, the third column will be ready to receive a flow of PLP water from the first PLPW circuit 300 as soon as the PLP processing step has been completed in the first column.

In the meantime, the fourth column can be loaded with the fourth batch of biomass feedstock as soon as the flooding and warming steps have commenced in the third column, such that the flooding and warming steps in the fourth column commence at the same time that the flow of PLP water commences through the second column. Consequently, the fourth column will be ready to receive a flow of PLP water from the second PLPW circuit 301 as soon as the PLP processing step has been completed in the second column.

In the meantime, the fifth column can be loaded with the fifth batch of biomass feedstock as soon as the flooding and warming steps have commenced in the fourth column, such that the flooding and warming steps in the fifth column commence at the same time that the flow of PLP water commences through the third column. Consequently, the fifth column will be ready to receive a flow of PLP water from the first PLPW circuit 300 as soon as the PLP processing step has been completed in the third column.

In the meantime, the sixth column can be loaded with the sixth batch of biomass feedstock as soon as the flooding and warming steps have commenced in the fifth column, such that the flooding and warming steps in the sixth column commence at the same time that the flow of PLP water commences through the fourth column. Consequently, the sixth column will be ready to receive a flow of PLP water from the second PLPW circuit 301 as soon as the PLP processing step has been completed in the fourth column.

In the meantime, the first batch of biomass feedstock in the first column will have been cooled and unloaded, after which the first column can be loaded with the seventh batch of biomass feedstock as soon as the flooding and warming steps have commenced in the sixth column, such that the flooding and warming steps in the first column with the seventh batch of biomass feedstock can column commence at the same time that the flow of PLP water commences through the fifth column. Consequently, the first column with the seventh batch of biomass feedstock will be ready to receive a flow of PLP water from the first PLPW circuit 300 as soon as the PLP processing step has been completed in the fifth column.

It is to be noted that in this example of a multiple-stream 6-column PLPW set as shown in FIGS. 1-7, with a biomass feedstock provided with a 40-min PLP processing step in each column, there is no idle time between when a column is reloaded with a fresh batch of biomass feedstock and when the flooding and warming steps can be commenced therein (FIG. 10). Accordingly, in this example with a 40-min PLP processing step, nineteen 10-kg batches, i.e., a total of 190 kg of biomass feedstock can be processed in an 8-h period.

It is also to be noted that the multiple-stream 6-column PLPW system described in this example relies on one flooding circuit, one warming circuit, and one cooling circuit interconnected and in communication with each of the six columns, and also provides two separate PLP processing circuits that are interconnected and in communication with each of the six columns.

Figure 11:
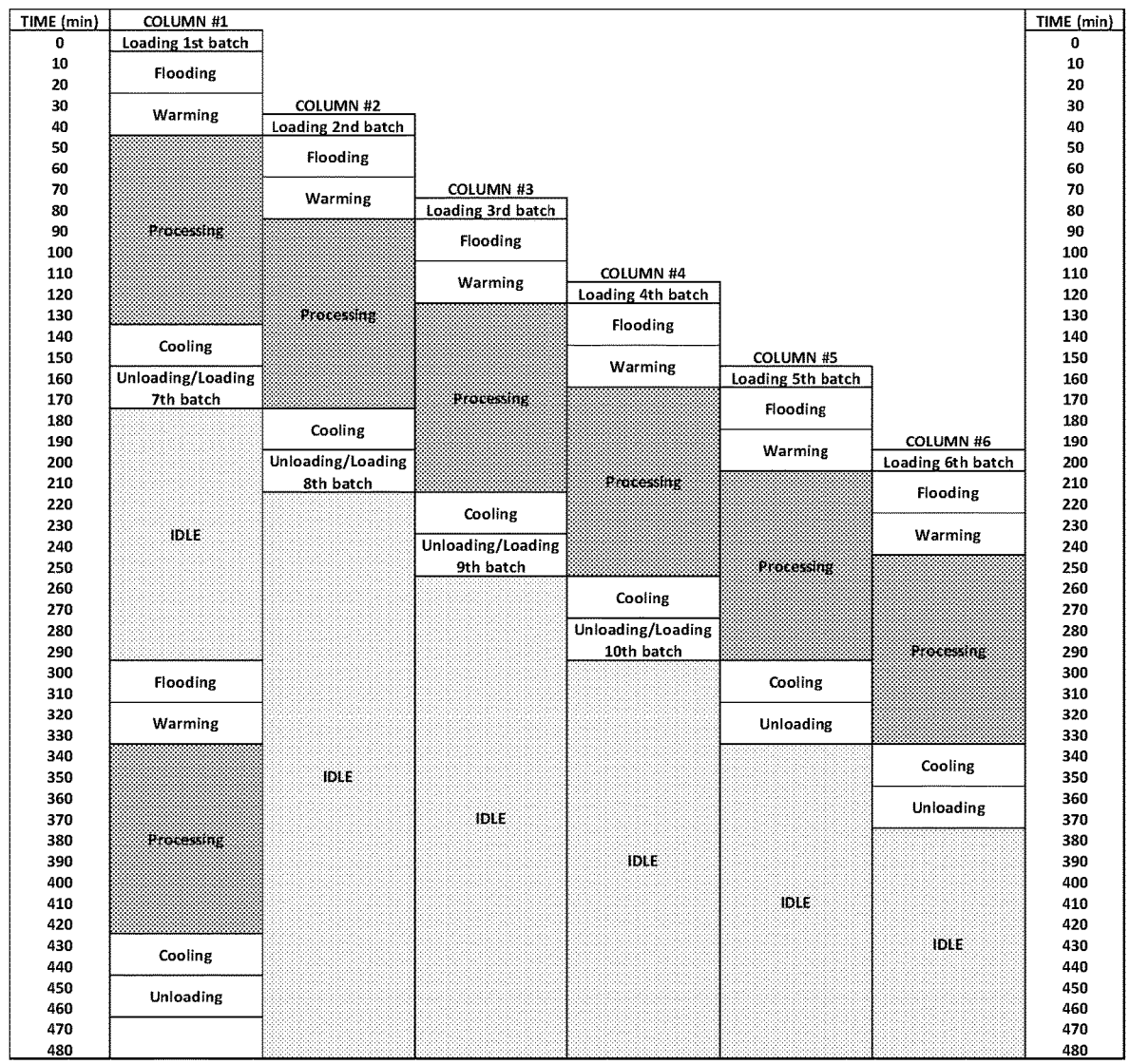
FIG. 11 is a process timeline chart of the throughout during an 8-hr day through a 6-column prior art single-stream PLPW system using a 90-min PLPW extraction period for each column.
Figure 12:
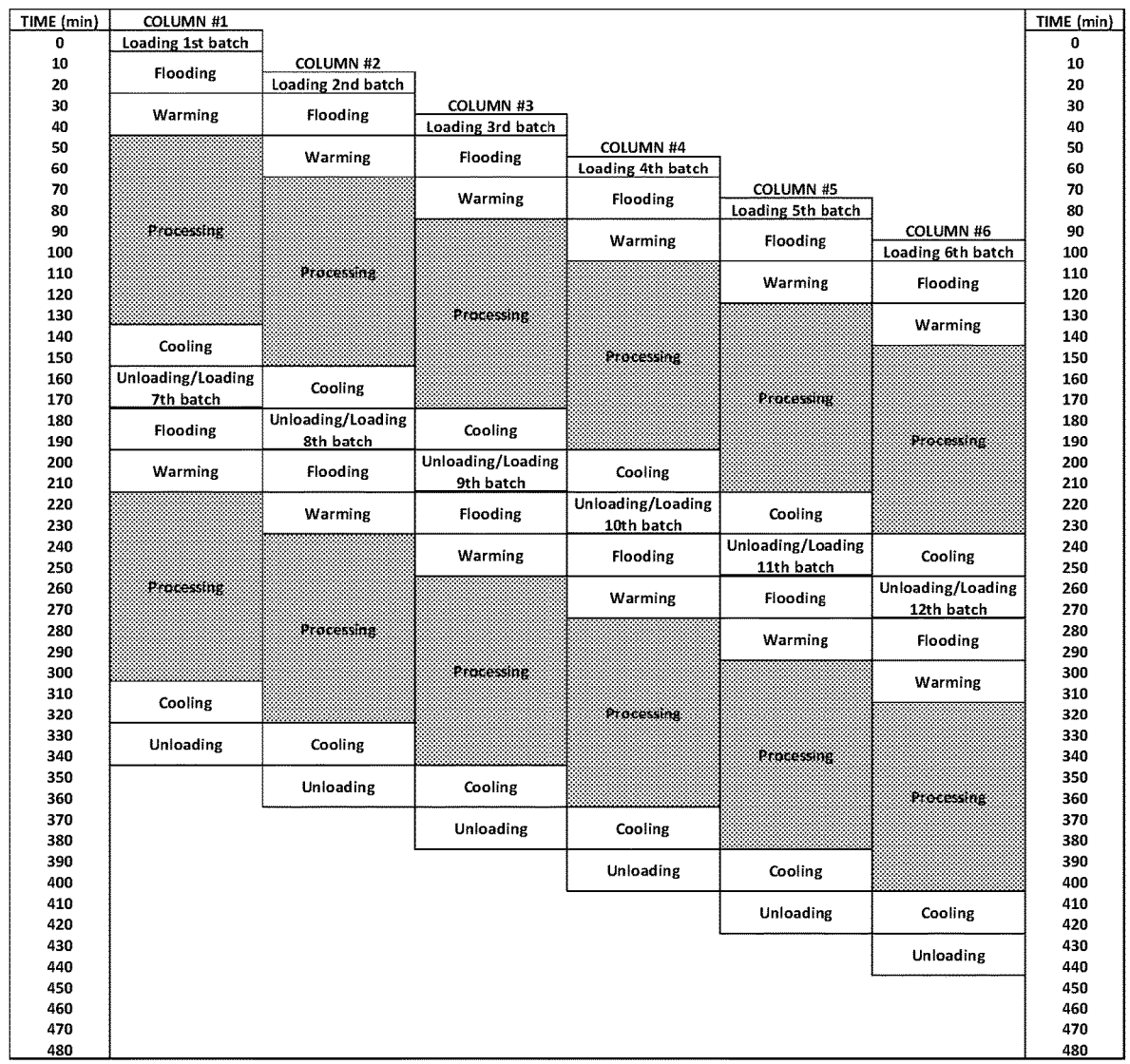
FIG. 12 is a process timeline chart of the throughout during an 8-hr day through a 6-column multiple-stream PLPW system according to one embodiment of the present disclosure using a 90-min PLPW extraction period for each column.

Example 2: Comparison of a Single-Stream 6-Column PLPW Processing System with a Multiple-Stream 6-Column PLPW Processing System, Both Having a 90-Min PLPW Processing Step in Each Column FIG. 11 is process timeline chart during an 8-hr day (480 min) for the throughput of a single-stream PLPW system (prior art) configured with six reaction columns as set out in the disclosure in CA 2,836,200 (in reference to FIGS. 2 and 2A, with the addition of a sixth column to the five columns depicted) wherein a single supply of PLPW is provided by the apparatus to all six reaction columns. In comparison, FIG. 12 is a process timeline chart during an 8-hr day (480 min) for the throughput of a multiple-stream PLPW system according to the present disclosure in reference to present FIGS. 1-7.

The assumptions for PLPW process timelines illustrated in FIGS. 10 and 11 were: (i) each of the six columns is loaded with 10 kg of biomass feedstock, (ii) the first batch into each column requires 10 min to load, (iii) the time required for the flooding with preconditioned water is 20 min, (iv) the time to warm the flooded column to a selected temperature is 20 min after which, (v) the column is processed with PLP water for a 90-min period during which time solubilisation and extraction of the components occurs, (vi) release from the PLP conditions and cooling the extracted biomass feedstock for 20 min, after which (vii) the extracted biomass is unloaded from the column (10 min is allocated for the unloading step). In summary, the PLPW process through each of the columns in the prior art system of CA 2,836,200 and each of the columns in the apparatus and systems according to the present disclosure, comprises 6 steps and requires 120 mins to complete. The configuration of the CA 2,836,200 system enables switching of the PLP water flow from each column at the end of the PLP water extract step in that column. As shown in FIG. 11, the flow of PLP water can be switched from the first column to the second column 80 min. after the flooding step is started in the first column, and that the flow of PLP water in the process done in sequence through all six columns configured as taught in the prior art system, requires 280 min (4 h and 50 min) from when the flow is first initiated in the first column and is completed in the sixth column. In the meantime, the remaining process steps in the first column with the first batch of biomass feedstock can be completed in 40 min after which it is ready for commencement of a repeat of the process steps with the seventh batch of biomass feedstock starting with flooding and warming. However, the flooding and warming steps cannot be started in the first column with the seventh batch of biomass feedstock, until the flooding and warming steps have been completed in the sixth column with the sixth batch of biomass feedstock. As a consequence, the first column has to remain idle for 120 min after it is ready for the processing steps. Because of the sequential processing of each column, only the first of the six columns can be used in an 8-hr period to process a second batch of biomass feedstock with the end result that the prior art PLPW system in this example with a 90-min PLPW processing step, will throughput only seven 10-kg batches of biomass feedstock, i.e., 70 kg in an 8-h period.

The multiple-stream PLPW system disclosed in this example provides a second PLPW circuit that is interconnected to each of the six columns (FIGS. 1, 2, 6). As shown in FIG. 12, as soon as the first column has been loaded with the first batch of biomass feedstock and the flooding and warming steps have commenced in the first column, the second column can be loaded with the second batch of biomass feedstock and the flooding and warming steps commenced in the second column. After completion of the flooding and warming steps have been completed in the first column, it then receives a flow of PLP water from the first PLPW circuit 300 (FIGS. 1, 2, 5). After completion of the flooding and warming steps have been completed in the second column, it then receives a flow of PLP water from the second PLPW circuit 301 (FIGS. 1, 2, 6) starting about 20 min after the flow of PLP water from the first PLPW circuit 300 into the first column.

In the meantime, the third column can be loaded with the third batch of biomass feedstock as soon as the flooding and warming steps have commenced in the second column, such that the flooding and warming steps in the third column commence at the same time that the flow of PLP water commences through the first column. Consequently, the third column will be ready to receive a flow of PLP water from the first PLPW circuit 300 as soon as the PLP processing step has been completed in the first column.

In the meantime, the fourth column can be loaded with the fourth batch of biomass feedstock as soon as the flooding and warming steps have commenced in the third column, such that the flooding and warming steps in the fourth column commence at the same time that the flow of PLP water commences through the second column. Consequently, the fourth column will be ready to receive a flow of PLP water from the second PLPW circuit 301 as soon as the PLP processing step has been completed in the second column.

In the meantime, the fifth column can be loaded with the fifth batch of biomass feedstock as soon as the flooding and warming steps have commenced in the fourth column, such that the flooding and warming steps in the fifth column commence at the same time that the flow of PLP water commences through the third column. Consequently, the fifth column will be ready to receive a flow of PLP water from the first PLPW circuit 300 as soon as the PLP processing step has been completed in the third column.

In the meantime, the sixth column can be loaded with the sixth batch of biomass feedstock as soon as the flooding and warming steps have commenced in the fifth column, such that the flooding and warming steps in the sixth column commence at the same time that the flow of PLP water commences through the fourth column. Consequently, the sixth column will be ready to receive a flow of PLP water from the second PLPW circuit 301 as soon as the PLP processing step has been completed in the fourth column.

In the meantime, the first batch of biomass feedstock in the first column will have been cooled and unloaded, after which the first column can be loaded with the seventh batch of biomass feedstock as soon as the flooding and warming steps have commenced in the sixth column, such that the flooding and warming steps in the first column with the seventh batch of biomass feedstock can column commence at the same time that the flow of PLP water commences through the fifth column. Consequently, the first column with the seventh batch of biomass feedstock will be ready to receive a flow of PLP water from the first PLPW circuit 300 as soon as the PLP processing step has been completed in the fifth column.

It is to be noted that in this example of a multiple-stream 6-column PLPW set as shown in FIGS. 1-7, with a biomass feedstock provided with a 90-min PLP processing step in each column, there is no idle time between when a column is reloaded with a fresh batch of biomass feedstock and when the flooding and warming steps can be commenced therein (FIG. 12). Accordingly, in this example with a 90-min PLP processing step, twelve 10-kg batches, i.e., a total of 120 kg of biomass feedstock can be processed in an 8-h period.

It is also to be noted that the multiple-stream 6-column PLPW system described in this example relies on one flooding circuit, one warming circuit, and one cooling circuit interconnected and in communication with each of the six columns, and also provides two separate PLP processing circuits that are interconnected and in communication with each of the six columns.

It is possible if so desired, to expand the processing capacity of the multiple-stream 6-column PLPW system by providing additional columns, for example 3 or 5 or 6 or more columns, along with a third separate PLP processing circuit that is interconnected and in communication with each of the six columns and the additional columns.

Example 3: Extraction of Catechins from Chardonnay Grape Seed with a Single-Stream Prior Art PLPW Processing System It is well known that grape seeds are rich in phytochemicals such as gallic acid, catechin, epicatechin, proanthocyanidins, among others. The present example compared the efficiency of extraction of catechins form Chardonnay grape seed using a prior art single-stream PLPW processing system and multiple-stream PLPW processing system according to an embodiment of the present disclosure.

A production-scale prior art PLPW system was configured as described in a disclosure in CA 2,836,200 (refer to page 11 line 3 through page 16 line 22 in reference to FIG. 9) was used to extract catechins from 50-kg batches of dried Chardonnay grape seed (about 5% moisture content) at two processing temperatures i.e., 125° C. and 135° C.

For the 135° C. extraction, after the column was flooded, the steam jacket pressure was brought up to 30 psig over a period of 30 minutes to bring the biomass up to a volume of 480 L and an extraction temperature of 135° C. Next, during processing, water was heated to 135° C. and then fed through the bottom of the column at 6 L/min and the extract solution egressing from the top of the column was collected for a period of 80 minutes. Catechin analysis was performed on 8 samples collected from the liquid extract (total volume of the liquid extract was 480 L). The results from this extraction process during one production campaign are shown in Table 1. The extract produced from this processing condition averaged 1.86% catechins content (measured on a dry weight basis) in the dried extract. The dry matter content averaged 2.26% solids in the liquid extract at this condition, giving an average total dry matter yield of 21.6% from the extraction of the 50-kg batch of Chardonnay grape seed.

TABLE 1

Catechin extraction from Chardonnay grape seed in a single-stream PLPW apparatus at 135° C.

| Sample # | Dry matter (%) | Dry matter yield (%) | Catechin concentration (%) |
|---|---|---|---|
| 1 | 2.18 | 23.2 | 2.12 |
| 2 | 2.34 | 22.0 | 1.84 |
| 3 | 2.31 | 22.5 | 1.84 |
| 4 | 2.22 | 21.3 | 1.92 |
| 5 | 2.27 | 24.0 | 1.75 |
| 6 | 2.14 | 19.8 | 1.88 |
| 7 | 2.42 | 17.2 | 1.70 |
| 8 | 2.16 | 21.0 | 1.84 |
| Mean | 2.26 | 21.6 | 1.86 |

For the 125° C. extraction, after the column was flooded, the steam jacket pressure was brought up to 20 psig over a period of 30 minutes to bring the biomass up to up to a volume of 480 L and an extraction temperature of 125° C. Next, during processing, water was heated to 125° C. and then fed through the bottom of the column at 6 L/min and the extract solution egressing from the top of the column was collected for a period of 80 minutes. Catechin analysis was performed on 6 samples collected from the liquid extract (total volume of the liquid extract was 480 L). The results from this extraction process during one production campaign are shown in Table 2. The extract produced from this processing condition averaged 2.54% catechins content in the dried extract. The dry matter content averaged 2.05% solids in the liquid extract at this condition, giving an average total dry matter yield of 19.5% from the extraction of the 50-kg batch of Chardonnay grape seed.

TABLE 2

Catechin extraction from Chardonnay grape seed in a single-stream PLPW apparatus at 125° C.

| Sample # | Dry matter (%) | Dry matter yield (%) | Catechin concentration (%) |
|---|---|---|---|
| 1 | 2.10 | 20.0 | 2.93 |
| 2 | 1.92 | 18.8 | 2.26 |
| 3 | 1.99 | 17.3 | 2.74 |
| 4 | 1.79 | 19.7 | 2.51 |
| 5 | 2.30 | 22.3 | 2.34 |
| 6 | 2.19 | 18.6 | 2.48 |
| Mean | 2.05 | 19.5 | 2.54 |

Overall, while the differences in dry matter yield by PLPW extraction at the two temperatures were marginal, the catechin content in the liquid extract produced at 125° C. was 74% higher than the catechin content in the liquid extract produced at 135° C. It was observed that the grape seed extract produced under PLPW extraction at 135° C. had propensity to deposit solids within the extractor piping when compared to the extract produced at 125° C. For these reasons, the 125° C. extraction was selected as the optimum processing condition for PLPW extraction of Chardonnay grape seed. Under the PLPW conditions used in this example, the single-stream prior art PLPW system produced approximately 7.4 kg of grapeseed extract per hour (dry weight) with a catechin content of 2.54%.

Example 4: Extraction of Catechins from Chardonnay Grape Seed with a Multiple-Stream PLPW Processing System In this example, extraction of catechins from Chardonnay grape seed was modelled with: (i) a six-column PLPW system having two PLPW processing circuits as illustrated in FIGS. 1-7 (i.e., a multiple-stream PLPW processing system), and (ii) a single-stream prior art PLPW processing having six columns and a single PLPW processing circuit as illustrated and disclosed in CA 2,836,200 (refer to page 7 line 20 through page 10 line 21 in reference to FIGS. 1-6). The assumptions used for the modelling are shown in Table 3.

TABLE 3

| Characteristic | Single-stream PLPW system | Multiple-stream PLPW system |
|---|---|---|
| Column height | 185 cm | 185 cm |
| Column diameter | 29.8 cm | 29.8 cm |
| Column volume | 129 L | 129 L |
| Feedstock loading | 50 kg | 50 kg |
| Extraction temperature | 125° C. | 125° C. |
| PLP water flow rate | 6 L/min | 6 L/min |
| Extraction time period | 80 min | 80 min |
| Volume per extraction | 480 L | 480 L |
| Extract dry matter content | 2.05% | 2.05% |

The assumptions were also made that: (i) the single-stream PLPW process would follow the process timeline chart set out in FIG. 11 as described in Example 3, and (ii) the multiple-stream PLPW process would follow the process timeline chart set out in FIG. 12 as described in Example 3.

On the basis of these assumptions, the single-stream PLPW system would process seven 50-kg batches of grape seed whereby each batch would produce 480 L of liquid extract for a total 3,360 L in an 8-h day (following the process timeline chart set out in FIG. 11). Using the data generated in Example 3, i.e., an 80-min extraction at 125° C. would produce a dry matter content in the liquid extract of 2.05%, each 50-kg batch of grape seed would produce 9.84 kg of catechins (i.e., dry matter) for a total of 68.88 kg of catechins in an 8-h day.

The multiple-stream PLPW system would process twelve 50-kg batches of grape seed whereby each batch would produce 480 L of liquid extract for a total 5,760 L in an 8-h day (following the process timeline chart set out in FIG. 12). Accordingly, each 50-kg batch of grape seed would produce 9.84 kg of catechins for a total of 118.08 kg of catechins in an 8-h day.

The invention claimed is:

1. An apparatus for extracting and recovering components from a biomass feedstock with pressurized low polarity water, comprising:
    four or more reaction columns, each column separately communicating with: (i) a supply of heated water, (ii) a first supply of heated pressurized water, (iii) a second supply of heated pressurized water, and (iv) a supply of cooled pressurized water, each column having an outlet for egressing a liquids product flow, configured such that one of the reaction columns optionally receives a flow of heated pressurized water from the first supply of heated pressurized water while a second of the reaction columns is receiving a flow of heated pressurized water from the second supply of heated pressurized water;
    a first pump pressurizing a first portion of the supply of heated water to provide said first supply of heated pressurized water downstream of the first pump;
    a second pump pressurizing a second portion of the supply of heated water to provide said second supply of heated pressurized water downstream of the second pump;
    a first plurality of valves cooperating with each of said reaction columns and (i) the supply of heated water, (ii) the first supply of heated pressurized water, (iii) the second supply of heated pressurized water, and (iv) the supply of cooled pressurized water, for controlling a flow from each of said supplies of hot water, heated pressurized water and cooled pressurized water into each of said reaction columns;
    a second plurality of valves cooperating with each of said reaction columns and (i) the supply of heated water, (ii) the first supply of heated pressurized water, (iii) the second supply of heated pressurized water, and (iv) the supply of cooled pressurized water, for controlling a flow of each of said supplies of hot water, heated pressurized water and cooled pressurized water out of each of said reaction columns; and
    a collection vessel for receiving a liquids product flow from each of said columns during a period of time when at least one of said columns is receiving a flow from the first supply of pressurized heated water or from the second supply of pressurized heated water.

2. The apparatus of claim 1, additionally comprising one or more water treatment apparatuses for receiving and purifying therein a waste water flow egressing from each of said reaction columns after each of said reaction columns has been de-pressurized.

3. The apparatus of claim 2, additionally comprising an apparatus for processing the purified water by one or more of heating and pH adjustment.

4. The apparatus of claim 1, additionally comprising a reservoir for storing a portion of a water source in fluid communication with the supply of heated water.

5. The apparatus of claim 1, additionally comprising a reservoir for storing a portion of a waste water flow egressing from each of said reaction columns after each of said reaction columns has been de-pressurized.

6. The apparatus of claim 1, additionally comprising one or more additional collection vessels for receiving therein the liquids product flow from each of said columns during a period of time when each of said columns is receiving a flow of hot pressurized water from the first supply of hot pressurized water or from the second supply of hot pressurized water.

7. The apparatus of claim 1, wherein the supply of heated water comprises a first piping infrastructure communicating with a water source, at least one first heat exchanger, at least one first heater, and a first back pressure regulator for flooding each of said reaction columns with hot water and generating pressurized low polarity water.

8. The apparatus of claim 1, wherein the supply of heated water comprises a second piping infrastructure communicating with a water source, at least one second heat exchanger, at least one second heater, and a second back pressure regulator for warming each of said reaction columns to a selected temperature.

9. The apparatus of claim 1, wherein the supply of heated water comprises a third piping infrastructure communicating with a water source, at least one third heat exchanger, at least one third heater, and a third back pressure regulator for continuously flowing hot pressurized low polarity water through one of said reaction columns, said third piping infrastructure additionally communicating with said collection vessel.

10. The apparatus of claim 1, wherein the supply of heated water comprises a fourth piping infrastructure communicating with a water source, at least one fourth heat exchanger, at least one fourth heater, and a fourth back pressure regulator for cooling each of said reaction columns to a selected temperature.

11. The apparatus of claim 1, additionally comprising an automated control system communicating with the four or more reaction columns, the supply of heated water, the first and second supplies of heated pressurized water, the supply of cooled pressurized water, the pumps for pressurizing each of said reaction columns, and the first and second pluralities of valves for controllably sequentially directing the flow of water into a first piping infrastructure, a second piping infrastructure, a third piping infrastructure, and a fourth piping infrastructure.

12. The apparatus of claim 11, wherein the automated control system is programmable.

13. The apparatus of claim 11, wherein the automated control system is manually operable.

14. The apparatus of claim 1, additionally comprising a manual control system communicating with the four or more reaction columns, the supply of heated water, the first and second supplies of heated pressurized water, the supply of cooled pressurized water, the pumps for pressurizing each of said reaction columns, and the first and second pluralities of valves for controllably sequentially directing the flow of water into a first piping infrastructure, a second piping infrastructure, a third piping infrastructure, and a fourth piping infrastructure.

* * * * *